United States Patent Office 3,439,887
Patented Apr. 22, 1969

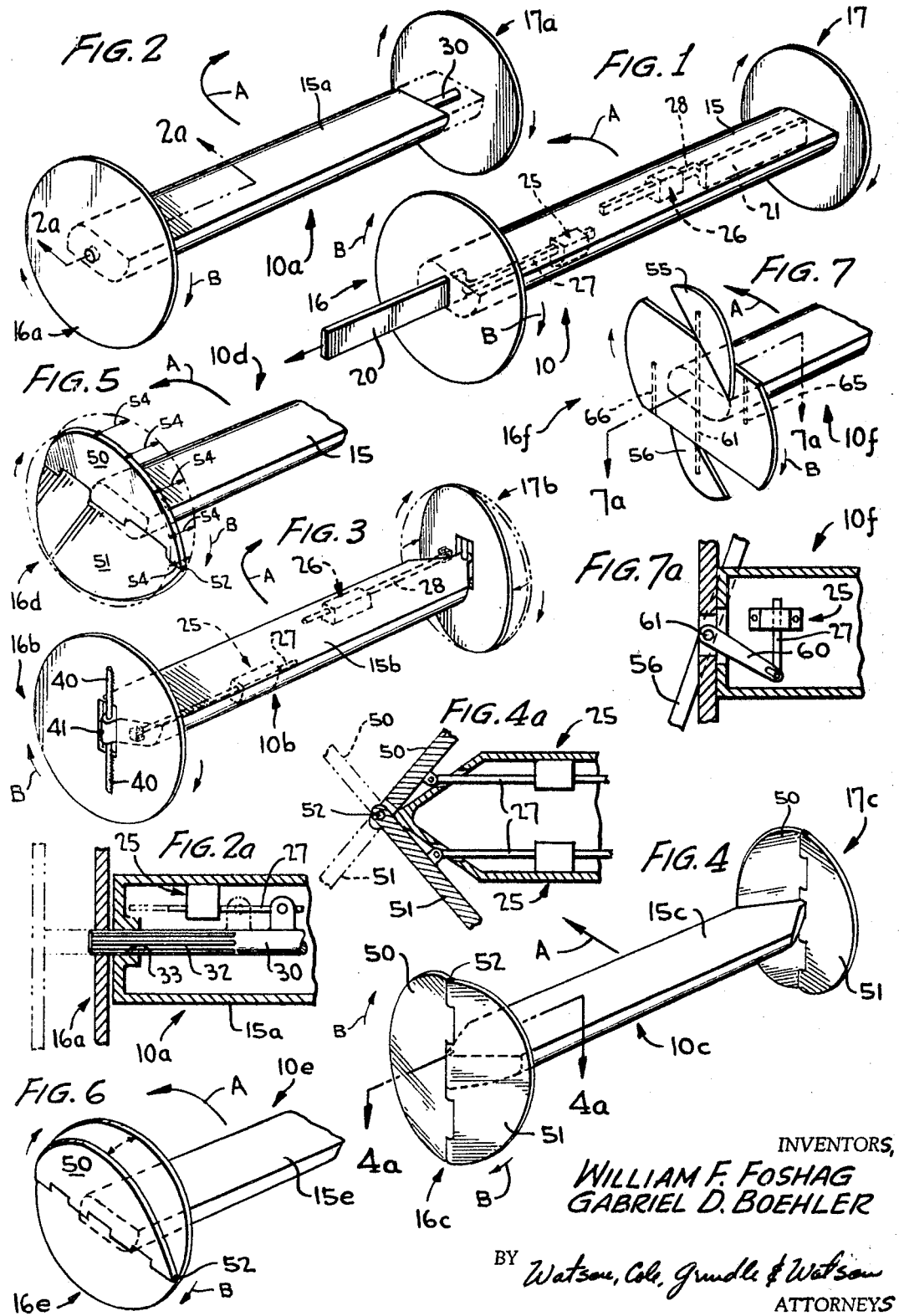

3,439,887
WING ROTOR CONTROL APPARATUS
Gabriel D. Boehler and William F. Foshag, Washington, D.C., assignors to Aerophysics Company, Washington, D.C., a corporation of the District of Columbia
Continuation-in-part of application Ser. No. 405,420, Oct. 21, 1964. This application July 22, 1966, Ser. No. 567,104
Int. Cl. B64c 27/22, 5/10, 39/02
U.S. Cl. 244—10          5 Claims

ABSTRACT OF THE DISCLOSURE

An aircraft consisting of a wing capable of autorotation about its spanwise axis. The aircraft has aerodynamic control plates mounted on the tips of the wing and pivotable about an axis perpendicular to the autorotation axis. The control plates are controlled by means within the wing for providing yaw and lift control for the aircraft.

---

The present invention relates to improvements in aircraft of the wing rotor type and, more particularly, relates to such aircraft having improved means for providing yaw and lift control for said aircraft.

The present invention constitutes, in part, an improvement over the structure disclosed in our earlier filed application entitled Wing Rotors, Serial No. 405,420, filed October 21, 1964, now Patent Number 3,262,656, and assigned to the same assignee as the present application, and thus the present application is a continuation-in-part of said earlier filed application.

In this earlier application, there is disclosed and claimed an aircraft having a wing which is conformed for autorotation incident to its gliding or powered movement through the air along the line of flight. These wing rotors have proven to have great potential for use in such specialized aircraft applications as involved in precise gliding delivery of cargo from a parent aircraft to a small landing area without damage to the cargo. As fully explained in the aforementioned application, aircraft constructed in accordance with this wing rotor principle possess a high degree of stability, have great load carrying capabilities, and are capable of gliding at relatively slow speeds without stalling. In view of the possibilities of wide use of wing rotors to carry and deliver various sizes and types of loads under varying atmospheric and wind conditions, it would be desirable to provide control means adapted to efficiently control the yaw and lift of a wing rotor during maneuvering and landing operations for any given combination of the above mentioned conditions.

Accordingly, it is one object of the present invention to provide a wing rotor of the type described having improved control structure.

It is a further and related object of the present invention to provide an aircraft employing the wing rotor principle wherein is provided aerodynamic control plates or members mounted at the respective ends of the wing to generate efficient and precisely controllable aerodynamic drag and, in some cases, to effect center of gravity shift for controlling the yaw and lift of said aircraft.

According to one aspect of the present invention, an aerodynamic control member is mounted adjacent each end of the wing rotor, which member is capable of being selectively exposed along the longitudinal axis of the wing during flight to generate the desired aerodynamic drag in this region in repsonse to a remotely controlled power unit carried by the wing; it being understood that the induced aerodynamic drag causes the aircraft to yaw about the normal axis of the aircraft and thus change direction if only one of said members is exposed, and similarly causes the lift of said aircraft to be reduced if both members are operated conjointly. The construction of this aspect of the invention can either take the form of extensible control members mounted for movement between a first position within the wing rotor and a second exposed position outside said wing, or the form wherein the wing is bodily shiftable along a supporting rod interconnecting the aerodynamic control plates at each end of said wing. In this latter case, the rod is thus exposed by a shifting of said wing to increase or decrease the exposed portion of said rod at the respective ends and thus the relative drag on said ends. In enther of these cases, it is noted that, in addition to the aerodynamic drag which is generated for the desired control, the shifting of the axial control members or wing provides a simultaneous shift in the center of gravity to modulate the control action of the aircraft.

In accordance with an alternative embodiment of the present invention, and aerodynamic control plate is carried by each end of the wing for resisting side slippage of the aircraft, which plate is provided with two substantially equal tab portions, and means are provided for pivotally connecting said tab portions to said wing so that said tab portions can be selectively positioned to increase or decrease the aerodynamic drag in response to a remotely controlled power unit carried by the wing. With this arrangement, it will be realized that the entire control plate is capable of being repositioned in the air stream to gain the maximum aerodynamic drag and side thrust for steering or trajectory control of the aircraft. At the same time, the autorotation of the wing insures that the control plates are constantly rotating about their central axis so that considerable centrifugal or gyroscopic force is built up, tending to maintain the tab portions in a vertical planar relationship for stability during straight line flight. As a result, this arrangement is particularly adapted for use in those aircraft applications where maximum control capability as well as stability of the wing rotor is desired.

This control plate structure usually takes the form wherein the pivot axis is perpendicular to the longitudinal axis of the wing, and said pivot axis can be either along the chord of the wing or perpendicular thereto. In the latter case, that is, where the pivot axis extends perpendicular to the chord of the wing, it has been found that the inboard deflection of the tab portions of the control plates is particularly effective to control the attitude of the aircraft, which, it is believed, results from the fact that a portion of the leading edge of the wing is more effectively blocked from the laminar flow of air by said tab portions. Additionally, in accordance with this embodiment, there may be provided a separate stabilizing plate adjacent the pivoted tab portions, said portions being normally held in face-to-face contact with the stabilizing plate during normal flight to prevent undesired deflection thereof.

According to still another aspect of the present invention, it has been found that control tabs mounted about axes lying in the plane of the aerodynamic control plates of the wing provide a substantial amount of useful aerodynamic drag with a minimum amount of actuating power required. This is so since with this arrangement, the pivotal tabs are not susceptible to the gyroscopic force tending to move the same back to a neutral position as discussed above. On the other hand, if desired, these tab portions may be pivoted forward of the normal or symmetrical axis thereof, whereby the aerodynamic forces normally tend to return it to the neutral or vertical planar position.

Thus, it is another object of the present invention to provide an aircraft of the wing rotor type having drag producing elements which are adapted to be exposed at each end of the wing to control the yaw and lift of the aircraft.

It is a further and related object of the present invention to provide a wing rotor aircraft which includes axial control members capable of producing aerodynamic drag and simultaneously a modulating shift in the center of gravity for improved control capability of the aircraft.

It is another object of the present invention to provide a wing rotor aircraft having aerodynamic control plates at each end of the wing, said plates being divided into two substantially equal tab portions whereby control of the aircraft can be effected due to induced drag and aerodynamic side thrust, and maximum stability can be gained during straight line flight due to centrifugal force acting on the tab portions.

It is still another object of the present invention to provide improved control plates for a wing rotor having tab portions of increased size whereby maximum control capability is gained by presenting a large drag-producing surface, and in some cases, by effectively blocking a portion of the airfoil of said wing rotor from laminar or lift-producing air flow.

It is a further object of the present invention to provide a wing rotor with control plates having tab portions which are pivotal about an axis or axes lying in the plane of the control plate, whereby there is encountered no centrifugal force resistance to repositioning of said tab portions.

Still other objects and advantages of the present invention will become readily apparent to those skilled in this art from the following detailed description, wherein we have shown and described only the preferred embodiments of the invention, simply by way of illustration of the best modes contemplated by us of carrying out our invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIGURE 1 is a schematic, perspective view of an air craft or wing rotor employing extensible drag inducing members, constructed in accordance with the present invention;

FIGURE 2 is an alternative embodiment of the wing rotor illustrated in FIGURE 1;

FIGURE 2a is a cross-sectional view taken along line 2a—2a of FIGURE 2 showing a form of the remotely controlled power unit for the wing rotor of FIGURE 2;

FIGURE 3 is a schematic, perspective view of a wing rotor with improved pivotal drag inducing end plates constructed in accordance with the present invention;

FIGURE 4 is a schematic, perspective view of a wing rotor of an alternative embodiment of the wing rotor illustrated in FIGURE 3;

FIGURE 4a is a cross-sectional view taken along line 4a—4a of FIGURE 4 showing a form of the remotely controlled power unit for the wing rotor of FIGURE 4;

FIGURE 5 is an alternative embodiment of the wing rotor illustrated in FIGURE 4;

FIGURE 6 shows still another alternative embodiment of the wing rotor illustrated in FIGURE 4;

FIGURE 7 is a schematic, perspective view of still another alternative embodiment of the wing rotor of FIGURE 4;

FIGURE 7a is a cross-sectional view taken along line 7a—7a of FIGURE 7 showing a form of the remotely controlled power unit for the wing rotor of FIGURE 7.

Referring now specifically to FIGURES 1 and 2 of the drawings, there is disclosed an aircraft or wing rotor 10 constructed in accordance with one aspect of the present invention. It will be remembered that the wing rotors 10 are of the type disclosed and claimed in our previously filed application mentioned above and that such wing rotor 10 is constructed so as to be conformed for autorotation about a longitudinal axis extending span-wise thereof. As explained in detail in the aforementioned case, the center of gravity of the wing rotor 10 is such as to induce autorotation thereof incident to its movement through the air, and accordingly for the purposes of illustration, the wing rotor 10 in each of these figures can be considered to be moving along a selected line of flight, indicated by the solid line arrow A in each figure, while said wing rotor 10 autorotates in a reverse direction, as indicated by other solid line arrows B in each figure.

The wing rotor 10 includes a wing structure 15, which is or may be of any suitable profile which is capable of autorotation when moving under its own power or otherwise through the air. To resist side slippage of the wing rotor 10 in the air during flight, there is provided adjacent the ends or tips of the wing 15 a pair of control plates 16, 17 which are carried by and adapted for rotation with said wing 15. In the preferred embodiment illustrated, the control plates 16, 17 are in the form of discs so that the wing rotor 10 is adapted for rolling movement along the ground, which greatly facilitates the handling of the aircraft and the landing operation. Further, the circular shape of the control plate 16 is thought to induce a truer flight of the aircraft since upon rotation, as indicated by the arrows B, said plates 16, 17 are balanced at all radial positions; however, other shapes of the control plates 16, 17 could be used within the scope of the present invention, if desired.

In order to provide yaw and lift control of the aircraft in accordance with the teachings of the present invention, there is provided on the wing rotor 10 illustrated in FIGURE 1, a pair of extensible control members 20, 21 mounted at opposite ends of the wing 15 for movement through centrally located openings in the respective control plates 16, 17 between a retracted position inside the wing (note the right-hand member 21) and an extended position outside said wing (note left-hand member 20). It will be evident that when the left-hand member 20 is extended as shown in FIGURE 1, the direction of the line of flight is curved, as indicated by the arrow A in this figure. This yawing or turning action is, of course, a result of the increased drag imposed on the aircraft by the extended control member 20, which causes the opposite end of the wing 15 to be advanced and banked in such a manner as to effect the indicated left turn.

Similarly, if the right-hand control member 21 is extended and the left-hand control member 20 is retracted, then a right turn would be effected due to the increased drag induced by said control member 21. Furthermore, the conjoint extension of the control members 20, 21 into the air stream is effective to cause a symmetrical drag at each end of the wing 15 so that the resultant action is a reduction in the forward and rotational speed of the aircraft with a necessary reduction in the lift and a corresponding decrease in the lift-to-drag ratio of the aircraft. Consequently, when both control members 20, 21 are extended, the aircraft can be controlled in its straight line movements and, assuming that the wing rotor 10 is in a gliding mode of operation, the angle and the rate of descent can be appropriately increased.

The means for effecting the extensible movement of the control members 21, 21 can take any suitable form, and for the purposes of describing the present invention, there are illustrated in this figure receiver-servomotor power units 25, 26 carried on the inside of the wing 15 to actuate the respective control members 20, 21 through suitable connecting links 27, 28, respectively. Thus, during operation a signal is given to the appropriate power unit 25, 26, for example, by a transmitter operated and from the ground, whereby the control members 20, 21 may be operated and the steering or trajectory of the aircraft controlled, as desired.

Although any type of servomotor can be used in the power units 25, 26, a double-acting electrical solenoid is deemed to be appropriate for the purpose whereby the links 27, 28 conveniently form the armature of said solenoids. Alternatively, for example, the power units 25, 26 could equally as well employ a rotary motor and lead screw arrangement wherein the links 27, 28 constitute screw members that interact with the respective rotary motor to extend or retract the control members 20, 21.

Moving now to the alternative form of the invention shown in FIGURE 2, wherein like reference numerals refer to like parts with an additional suffix for further identification, there is shown a wing rotor 10a having a wing 15a which is mounted for shiftable movement along an elongated support rod 30 that serves to interconnect the fixed control plates 16a, 17a. Thus, when the shiftable wing 15a is in the full line position of FIGURE 2, the line of flight is as indicated by the arrow A, that is, in the form of a right turn, due to the aerodynamic drag induced by the exposed end of the rod 30 adjacent the control plate 17a. It will be realized that the turning action of the wing rotor 10a is a result of the same type of banking action that occurs from increasing the drag at one end of the wing rotor 10a, as described above.

As shown in FIGURE 2a, both ends of the rod 30 may be provided with a splined section 32 that coacts with a complementary opening 33 in the end wall of the wing 15a so that the control plates 16a, 17a rotate in unison with said wing 15a during operation. On the interior of the wing 15a the power unit 25 is connected in a suitable manner for effecting shifting movement of the wing 15a with respect to the rod 30 to change the attitude of the aircraft. In this respect, it will be realized that to effect a turning of the wing rotor 10a to the left, the power unit 25 is actuated to shift the wing 15a to the right (note dotted line position of FIGURE 2) whereby the rod 30 adjacent the control plate 16a is exposed to the air stream thus creating a drag and corresponding turning movement to the left. Furthermore, it should be clear that when the wing 15a is positioned in the center of the rod 30 or equidistant from the control plates 16a, 17a, straight line flight of the aircraft is effected.

It will be evident that in both the wing rotor 10 and the wing rotor 10a just described, there is a corresponding change in the center of gravity of the aircraft as the relative shifting of the parts is effected to control the steering or trajectory of the aircraft. In other words, as the control members 20, 21 are moved along the axis of the wing 15 in FIGURE 1, the center of gravity is shifted in the direction of the actuated member 20, 21 and similarly, in FIGURE 2, as the wing 15a is shifted along the support rod 30, the center of gravity of the overall aircraft is shifted in the direction that said wing 15a is shifted. This shifting of the wing advantageously modulates the steering and trajectory control of this form of the invention in that this shift in the center of gravity causes an additional force to be interposed into the control. This shift in the center of gravity of the wing rotors 10, 10a is found to generally be in the direction such as to resist the yawing interposed on the aircraft by the aerodynamic drag, thus causing a modulation of the turning moment that creates a smoother and less abrupt change in direction than would otherwise be caused. In other words, the effect of the predominant aerodynamic drag acting on the wing rotors 10, 10a when in a turning mode is modulated by the simultaneous but lesser turning force caused by a shift in the center of gravity of the aircraft.

With reference now to FIGURES 3-5 of the drawings, there is illustrated wing rotors 10b, 10c, and 10d, respectively, which employ control systems including pivotally mounted control plates 16b–d, 17b–d that give combined aerodynamic drag and side thrust for improved steering and trajectory control of the aircraft along with improved stability during straight line flight. In these figures it will be noted that like reference numerals with a suffix have been used to indicate like elements as before, and the autorotation of the aircraft can be considered to be the same as in the aircraft shown in FIGURES 1 and 2.

In FIGURE 3, the control plates 16b, 17b are preferably rigid discs having a mounting shaft 40 extending diametrically across each of the discs 16b, 17b. As shown, the shaft 40 is appropriately mounted by the hinge 41 carried along the centerline of the wing 15b so as to be perpendicular to the chord of said wing 15b. To allow for deflecting movement of the control plates 16b, 17b, as indicated by the dotted line position and the full line position of the control plate 17b, the ends or tips of the wings are formed in a V shape thus allowing inboard deflection of the plates 16b, 17b, as indicated. It is noted that in this embodiment of the invention, the deflection of the control plate 17b as indicated causes the aircraft to bank to the right as indicated by the arrow A and conversely any deflection of the control plate 16b causes a corresponding turning to the left. Furthermore, a conjoint deflection of the control plates 16b, 17b does, of course, cause a symmetrical increase in the drag on the ends of the wing rotor 10b with a resultant reduction in lift and change in trajectory. As shown in FIGURE 3, the deflection of the plates 16b, 17b is or may be responsive to appropriate power units 25, 26 which act through the linkages 27, 28, respectively.

Referring now to FIGURE 4, it is pointed out that the control plates 16c, 17c consist of a pair of tab portions 50, 51 which are pivoted to each other and to the wing 15c by a suitable pivot shaft 52 which, like the embodiment shown in FIGURE 3, extends perpendicular to the chord of the wing 15c. In this case, the increased drag and side thrust for control of the aircraft is produced by selectively positioning the tab portions 50, 51 as desired. As shown in this figure, the tab portions 50, 51 can be deflected conjointly, as in the previous embodiments, whereby the line of flight, indicated by the arrow A is in a straight line but the speed and thus the lift of the aircraft is reduced effecting trajectory control. Due to the V-shape of the ends or tips of the wing 15c, the tab portions 50, 51 are capable of either outboard or inboard deflection; however, inboard deflection has been found to give unusually favorable results with regard to inducing the desired control drag and, perhaps more importantly, in controlling the lift-to-drag ratio. This results from the fact that when the tab portions 50, 51 are deflected as shown by the full line positions of this figure, a portion of the leading edges of the wing 15c are effectively blocked, which thus reduces the lift-producing air flow to said wing 15c thereby reducing the lift-to-drag ratio and thus improving the control capabilities of the aircraft.

FIGURE 4a illustrates a preferred embodiment of power means to selectively actuate the tab portions 50, 51 of control plate 16c, which comprises the dual power units 25 connected to the tab portions by links 27; it being understood that the control plate 17c has identical dual power units (not shown). It will be clear that the tab portions 50, 51 may be actuated either singly or in unison to effect the desired control of the aircraft.

As shown in FIGURE 5, the wing rotor 10d employs a slight modification of the wing rotor 10c shown in FIGURE 4, in that the pivot shaft 52 extends along the chord of the wing 15d rather than perpendicular to the chord, as in FIGURE 4. With this wing rotor 10d, the tab portions 50, 51 are likewise adapted for inboard or outboard deflection about the pivot shaft 52; however, as before, a deflection inboard has been found to give improved results since during the autorotation of the wing 15d a cylinder of disturbance is created along a portion of said wing 15d thereby giving reduced lift and resultant reduced lift-to-drag ratio for greater control capability.

In the wing rotors 10b–10d of FIGURES 3–5, the control plates 16, 17 are tended to be kept in a vertical planar position due to the gyroscopic or centrifugal force which results from the autorotation, as indicated by the arrows B in these figures. This advantageous result means that the plates 16, 17 will be automatically returned to a straight line position and will resist deflection until acted upon by the power units 25, 26 upon receiving a proper signal from the controller (not shown). Also, in the wing rotors 10c and 10d there is definitely created a low pressure region 54 (note FIGURE 5) on the downstream side of the tab portions 50, 51, which region produces a positive side thrust on the aircraft in a manner to modulate the action of the aircraft during its turning mode. That is, as can be viewed in FIGURE 5, the lower pressure region 54 on the near side of the control plate 16d during this mode causes a considerable side slippage of the aircraft through the air which coacts with the turning moment caused by the aerodynamic drag to cause a smoother or modulated turning of the aircraft. Thus, with this arrangement it can be seen that improved control capability is given while at the same time stability during straight line flight is assured.

A slight modification of the wing rotors shown in FIGURES 3–5 is illustrated in FIGURE 6 wherein is shown a wing rotor 10e having fixed control plates 16e, 17e at the ends of the wing 15e with one or more separate, deflectable tab portions 50 mounted for pivotal action along the diameter of said control plate 16e on the pivot shaft 52. Here, it will be realized that the tab portion 50 is brought into face-to-face relationship with the associated control plate 16e whereby still greater stability during straight line flight is assured since the fixed control plate 16e serves as rigid vertical positioner for said tab portion 50.

A special advantage is gained by employing a wing rotor 10f, as disclosed in FIGURE 7 of the drawings, in that in this arrangement, the control plate 16f has swingable tab portions 55, 56 mounted for pivotal movement about a substantially radially extending axis thus rendering said tab portions 55, 56 relatively insensitive to the gyroscopic force caused by the autorotation. As a result, in this case, the tab portions 55, 56 can be easily positioned into their drag-producing or operative position with a minimum amount of power since this gyroscopic force does not need to be overcome.

One means capable of effecting this positioning of the swingable tab portions 55, 56 is shown in FIGURE 7a, wherein the power unit 25 with the reciprocable link 27 serves to operate a crank arm 60 for oscillating a common support shaft 61 for said tab portions 55, 56. It is pointed out that due to the relatively small size of the tab portions 55, 56 used on the wing rotor 10f, the amount of power needed is further reduced from that which would be needed for the wing rotors 10c–10e, and thus it will, of course, be realized that this arrangement is more suited for conditions wherein only small corrections of steering and trajectory are required and/or the amount of actuating power available is limited.

It is contemplated that individual pivot shafts for the tab portions 55, 56 can be provided which are positioned off center and forward of the centerline of said control plate 16f, as indicated by the dashed lines 65, 66 in FIGURE 7, so that upon autorotation of said wing rotor 10f, said tab portions 55, 56 tend to assume a centered or vertical planar position due to the aerodynamic forces acting on the unbalanced configuration.

From the foregoing disclosure, it will be realized that efficient control means has been provided whereby the newly developed wing rotor can be adapted to various operating conditions and handle various types of loads. Further, it is evident that in each of these control arrangements the operating parts are desirably simple in construction for ease of manufacture and for economy, and that the weight of the aircraft is concentrated generally along the central axis for efficient autorotation of each of the wing rotors 10–10f.

We claim:

1. An aircraft consisting of a wing conformed and free for continuous autorotation about an axis extending spanwise thereof and transversely to its line of flight, the center of gravity of said wing being located to induce continuous autorotation of the wing incident to its movement through the air along said line of flight, said aircraft comprising aerodynamic control plates carried by the respective ends of said wing for rotation therewith for resisting side slippage thereof, each of said control plates being pivoted to said wing for angular movement about an axis extending perpendicular to said autorotation axis, yaw and lift control means carried solely by said wing for rotation therewith for selectively pivoting each of said plates independently of the other said plate about said pivot axis, whereby a corresponding aerodynamic drag is generated in the region of the actuated plate to provide yaw and lift control for said aircraft.

2. The combination of claim 1 wherein said pivot axis of said plates extends substantially perpendicular to the chord of said wing whereby said plates are capable of effecting blocking a portion of said wing from lift-producing air flow during flight.

3. The combination of claim 1 wherein said plates are disc-shaped whereby said aircraft is adapted to roll on the ground.

4. An aircraft as defined in claim 2, in which the opposite ends of said wing are of V-shape in plan, each said pivot axis being located at the apex of one said V-shaped wing end to allow inboard deflection of the control blades.

5. An aircraft as defined in claim 4 in which each of said control plates is divided into two substantially equal operable tab portions, both pivoted about a common said pivot axis, said control means being connected to at least one tab portion of each blade for controlling same independently of the tab portions of the other blade.

References Cited

UNITED STATES PATENTS

| | | | |
|---|---|---|---|
| 2,681,775 | 6/1954 | Orazi | 244—39 |
| 2,977,068 | 3/1961 | Davidson | 244—83 |
| 3,140,065 | 7/1964 | Alvarez-Calderon | 244—10 |
| 2,565,990 | 8/1951 | Richard | 244—90 |
| 2,649,265 | 8/1953 | Grant | 244—91 |
| 2,846,165 | 8/1958 | Axelson | 244—90 |
| 3,029,043 | 4/1962 | Churchill | 244—39 X |

MILTON BUCHLER, *Primary Examiner.*

THOMAS W. BUCKMAN, *Assistant Examiner.*

U.S. Cl. X.R.

244—21, 90, 153